Figure 1:
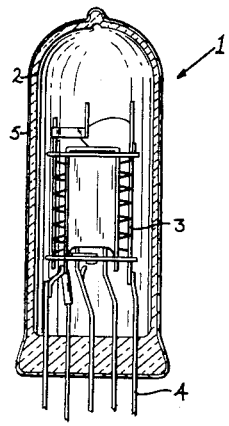

July 13, 1954

R. E. CUNNINGHAM 2,683,766

METHOD OF CASTING ELECTRICAL DEVICES AND
ARTICLE PRODUCED THEREBY
Filed Aug. 10, 1948

Inventor
RUSSELL EDWARD CUNNINGHAM

By Hyman Hurwitz

ATTORNEY

Patented July 13, 1954

2,683,766

UNITED STATES PATENT OFFICE 2,683,766

METHOD OF CASTING ELECTRICAL DEVICE AND ARTICLE PRODUCED THEREBY

Russell Edward Cunningham, Washington, D. C., assignor to Melpar, Inc., Alexandria, Va.

Application August 10, 1948, Serial No. 43,437

6 Claims. (Cl. 174—52)

This invention relates broadly to the potting within a casting of resinous plastic material, of electrical components generally, and particularly to the potting of fragile electrical components, such as miniature vacuum tubes and the like, for the purpose of protecting the latter against mechanical shock, moisture, fungus and various other effects deleterious to the life and proper functioning of the electrical components.

Broadly described, the present invention involves potting of electrical components, such as electronic vacuum tubes, metallic bodies, or the like, in polyester resin or other resins which are shock proof, rigid, and relatively non-hygroscopic, but which have a contractibility different from that of the electrical components during cooling or curing of the resinous compound. In general, it has been found that the resinous compounds utilized in fabricating a resinous casting contract during cooling and curing, and in relation to the contraction of glass or metal, contract volumetrically to a diffeernt extent than the latter. This difference in contractibility causes mechanical damage to electrical components, and especially to those which may incorporate glass in their structure, and in the case of miniature vacuum tubes in particular, results in leakage of gas into the envelope of the tube, destroying the operability of the tube. In the case of metallic bodies, the contraction of the metal is less than that of the casting, resulting in a defective casting rather than in damage to the metallic bodies.

It is well known in accordance with prior art practice, to seal vacuum tubes or other fragile electrical components within an envelope or container, which may take the form of a cylinder or sleeve, the container being formed of glass or of a relatively resilient plastic, prior to insertion of the components into the resinous casting material, in order that the covering may absorb the stresses due to the contraction of the resinous material during casting, thus avoiding damage to the components or defects in the casting. Various difficulties are found to exist in practice in this procedure, as applied particularly to miniature vacuum tubes. Insertion of the vacuum tubes into the containers is accompanied, in the first place, by considerable possibility of damage to the tubes, and the insertion requires very great care and accordingly consumes considerable time. Very often when damage has occurred this is not ascertainable until the potting process has been completed, so that considerable economic waste is involved in proceeding according to the known methods.

The present invention involves the coating of the vacuum tubes, or other electrical components, with a resilient plastic, which may be formulated with standard heat stabilizers and plasticizers, and which has the resilience requisite to enable the coating to absorb the stresses generated by the contraction of the main potting compound during polymerization and cooling of the latter, and which is essentially capable of forming a bond with the resinous casting.

It is the primary virtue of the present invention that the coating of the electrical components may be accomplished by a simple dipping process which requires very little time to accomplish, and which has been found, in practical manufacturing operations, to be practically 100% effective in protecting the fragile electrical components during potting, yet to involve substantially no possibility of damaging the components during the process of applying the protective coating thereto. The initial protective coating may, itself, be made of a plastic, preferably one which is relatively resilient, and since the protective coating is formed in a relatively thin coating, and is, in any event, resilient, no damage to the vacuum tubes or other electrical components result from the formation of the initial protective coating on the components. The coated components may then be inserted in the main potting compound, which may comprise resinous material, or in fact, any shock proof, rigid and relatively non-hygroscopic potting compound, prior to curing of the latter. The subsequent curing and cooling of the potting compound will have no mechanical effect upon the electrical components themselves, since the resilient plastic coating takes up the shrinkage of the potting compound and does not pass on stresses or strains to the coated electrical components.

Likewise, where the potting compound contracts more slowly than the potted element during cooling, the compound will not pull away from the latter to form a defective casting.

By proper choice of the composition of the protective coating with respect to the chemical constitution of the main potting compound, polymerization of the latter is not inhibited at the inter-face between the main casting and the resilient plastic of the coating, which serves to reduce stresses at or adjacent to the inter-face, and results in a smooth and uniform casting, not only in portions of the casting which are remote from the electrical components, but also at and adjacent thereto.

The use of a protective coating fabricated of a plastic which is compatible with the main potting compound is especially important in the present invention. It is not feasible to utilize as a protective coating such substances as rubber or latex, or the like, which appear to have the requisite mechanical properties, since such materials, being non-compatible with the resinous compound forming the casting, prevent polymerization of the latter over a wide volume adjacent to the rubber or latex, or the like, producing an unsatisfactory casting.

It is, accordingly, a broad object of the present invention to provide a novel method for potting fragile objects within a mass of shock proof, rigid and relatively non-hygroscopic material, such as polyester resin, or the like.

It is a more specific object of the present invention to provide a method of potting electronic vacuum tubes or other fragile electrical components in polyester resins, or other resins which are shock proof, rigid and relatively non-hygroscopic, in a rapid and efficient manner, and with substantially no spoilage.

It is, more specifically, an object of the present invention to provide, as a new article of manufacture, electric components in potted form, cast within a mass of resinous material, and particularly resinous material which initially exists hot in the liquid state, and which is converted by cooling to the solid state, wherein the components are provided with one or more protective layers of a resilient plastic material which is compatible with the material of the main casting. The resilient plastic material absorbs stresses due to contraction of the main body of the casting during cooling, in order to protect the electrical components mechanically, and the protective coating is compatible chemically with the main casting, so that the main casting is smooth and uniform in all parts thereof, including parts thereof which are at or adjacent to the inter-face of the protective coating and the main body of the casting.

Resinous castings constructed in accordance with the present invention are smooth and continuous throughout, having no air gaps or spaces, particularly at the inter-face between the protective coating and the main resinous casting, whereby electric leakage between the various parts of the electrical components when subjected to electrical stresses is completely obviated.

Figure 2:
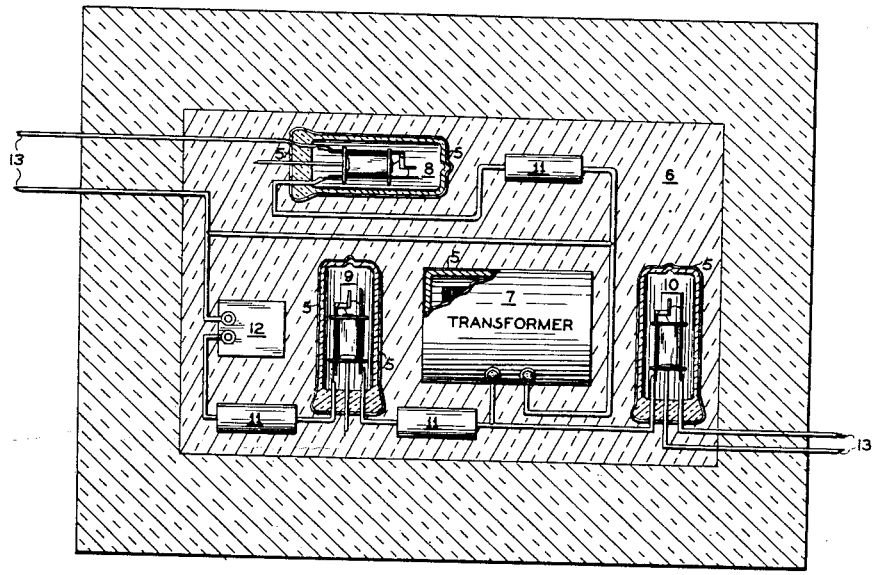

The novel features which are characteristic of my invention are set forth in the appended claims. The invention itself, however, will best be understood by reference to the following specification, when considered in connection with the accompanying drawings, in which:

Figure 1 is a longitudinal view taken in section and showing a composite structure comprising a miniature electronic vacuum tube surrounded by a cushioning coating, the latter being in turn surrounded by a resinous casting; and, Figure 2 is a view in longitudinal section showing a sub-assembly of electrical components, some of which have been provided with a protective and resilient coating prior to casting within a considerable mass of resinous material.

Two slightly different methods of dipping electrical components prior to casting are provided in accordance with the present invention. Both methods produce essentially the same result. However, the methods may be applied most advantageously in connection with the dipping of different types of components. Some types of electrical components are relatively temperature sensitive, or subject to damages when raised to a relatively moderate temperature, say 200° F., whereas other types are relatively temperature insensitive. The differences in dipping process are required by these differences in characteristics of the elements or units which are to be dipped.

In dipping temperature insensitive components or units, the components are first cleaned and freed of grease, and then heated to a temperature in the range approximately 70° to 325° F., depending on the thickness of the ultimate coating which is desired, the higher temperatures resulting in a greater thickness of coating in a given dipping time. For most purposes it has been found that a coating having a thickness of from 3 to 5 thousandths of an inch is adequate, and for this purpose a temperature intermediate the values 70° to 325° F., say about 200° F., may be employed. The component, after being cleaned and freed of grease and heated to the indicated temperature, is dipped into the liquid plastic, the latter comprising polyvinyl chloride formulated with a suitable plasticizer and heat stabilizer, in one specific application of the invention, which is sold commercially under the trade name "Geon" 100 X 210. The component is permitted to remain in the liquid plastic for the period of time necessary to enable the desired thickness of coating to be built up, after which the component is removed from the plastic and placed in an oven where it is heated at a temperature of 350° F. for the length of time required for plasticization. The part may then be removed from the oven, and when removed is ready for use.

In order to dip temperature sensitive parts, the use of a hot liquid plastic and the subsequent baking process is obviously inadvisable. For dipping components of this character, the components are first cleaned and rendered grease free, and thereafter are dipped at room temperature into a water suspension of polyvinyl chloride, which is known commercially by the trade name "Geon Latex 31X," and after being dipped, is removed and permitted to dry at room temperature, or at slightly higher temperature, for a length of time necessary for the complete evaporation of water from the coating. Successive dips may be made to build up the coating to the desired thickness, which may be in the neighborhood of 3 to 5 thousandths of an inch, and after the coating has been thoroughly dried the part is ready for casting.

Referring specifically to Figure 1 of the drawings, there is illustrated a miniature vacuum tube 1 having a glass envelope 2 containing various electrical elements 3 which are well known and commonly employed in the interior of electronic vacuum tubes, and comprising further a plurality of leads 4 for enabling electrical connection with the elements 3 internally of the tube. The reference numeral 5 denotes a coating of polyvinyl chloride, resulting from either of the dipping processes which have been described immediately above, and which has a thickness of 3 to 5 thousandths of an inch.

The same dipping process may be applied not only to electronic vacuum tubes, but to any electrical component which has a co-efficient of contraction substantially different from that of the resinous potting compound, and particularly it may be applied to metallic elements having any appreciable size, as for example, choke coils, transformers and the like.

In the case of electronic vacuum tubes, the glass envelope of the tube has substantially a zero co-efficient of contraction or expansion with heat, while the resinous potting compound contracts relatively sharply with cooling. Metallic elements, on the contrary, have a smaller coefficient of contraction than does the potting compound and, accordingly, tend to separate from the latter, introducing cracks in the potting compound which may extend entirely therethrough and render the final produce pervious to moisture, and likely to crack and break up in response to shock.

Small relatively soft elements such as resistors, condensers, and the like have sufficient resilience in and of themselves to give, under the strains introduced by the potting process, and do not normally require dipping.

After all the elements which are to be assembled on a common terminal board, as 6, Figure 2, and which require dipping, have been dipped and the requisite coating formed, the wiring process is completed, inter-connecting the various elements such as the transformer 7 and the electronic vacuum tubes 8, 9 and 10, with the various resistors 11, and the condensers 12, the entire terminal board 6 is then inserted in a liquid resinous compound, preferably a polyester resin, with the requisite leads 13 brought out externally of the casting. The entire casting is then permitted to cure at a slow rate, forming, eventually, a shock proof, rigid, non-hygroscopic covering for the electrical components.

It has been found in actual production work that application of my method provides highly effective potted electrical assemblies, which may be produced relatively rapidly and with substantially no spoilage, in contrast with the results which I have been able to obtain by the older methods known to me, and one of which is disclosed in the U. S. patent to Ver Planck et al., #2,222,729.

The particular type of coating which I have utilized in the practice of my product is entirely compatible with the particular resin which I use for the main casting, and the casting is smooth and uniform throughout every element of volume thereof to and including the inter-face between the coating and the casting. Accordingly, the process results in no damage to fragile electrical components, by reason of shrinking of the potting resin nor does the potting resin pull away from potted metallic element or crack, when potting metallic elements since the potting resin forms a bond with the resilient coating, which takes up volumetric differences between the metallic elements and the resin, introduced by the process of cooling and curing the casting.

Upon completion of the preparation of an article manufactured in accordance with my novel method, the resulting casting is found to be clear in color completely uniform in mechanical structure, and free of all cracks and air bubbles, and fragile electrical components included in the casting are found to be free of damage caused by stresses and strain introduced by cooling and curing of the casting.

What I claim as new and desire to secure by Letters Patent of the United States is:

1. An article of manufacture, comprising, a relatively fragile electrical component, a coating for said electrical component consisting of at least one layer of polyvinyl chloride, said coating completely enveloping said component and in intimate contact therewith over the entire surface thereof, and a substantial quantity of polymerized casting resin in an infusible solid state encompassing said coating, the characters of said casting resin and of said coating being such that polymerization of said casting resin at the interface between said resinous casting compound and said coating is complete, said casting resin being shock-proof, rigid, relatively non-hygroscopic and having a contractibility different from that of the electrical component during curing of the casting resin.

2. The combination in accordance with claim 1 wherein said electrical component is a miniature vacuum tube.

3. The method of casting a fragile body, having substantially no contraction during cooling, within a mass of polymerized resinous casting compound having substantial contraction during cooling, comprising, coating said fragile body in at least one layer of polyvinyl chloride drying said at least one layer of polyvinyl chloride, casting said fragile body coated with said polyvinyl chloride in liquid polymerizable resinous casting compound, and polymerizing and solidifying said casting compound, said casting compound having such character in relation to said polyvinyl chloride that polymerization of said casting compound is not prevented at the interface of said casting compound and said coating by the polyvinyl chloride, said casting compound being shock-proof, relatively non-hygroscopic and rigid.

4. The method in accordance with claim 3 wherein the step of enveloping is accomplished by dipping said fragile body in a water solution of said polyvinyl chloride at substantially room temperature, and the step of drying by evaporating the water from the solution.

5. The method in accordance with claim 3, wherein said coating is formed to a thickness between 2 to 10 thousandths of an inch.

6. The method in accordance with claim 3, wherein said coating is formed by heating said body to a temperature in the range 70°–325° F., dipping the heated fragile body in liquid polyvinyl chloride, removing the body from the liquid polyvinyl chloride with a coating of polyvinyl chloride adhering thereto, and heating the body and its coating at polymerizing temperature.

References Cited in the file of this patent

UNITED STATES PATENTS

| Number | Name | Date |
| --- | --- | --- |
| 1,497,449 | Kempton | June 10, 1924 |
| 1,613,758 | Lindstrom | Jan. 11, 1927 |
| 1,746,469 | Grunow | Feb. 11, 1930 |
| 2,184,876 | Sherts | Dec. 26, 1939 |
| 2,222,729 | Ver Planck | Nov. 26, 1940 |
| 2,354,908 | Binneweg | Aug. 1, 1944 |
| 2,372,208 | Klumb | Mar. 27, 1945 |
| 2,397,242 | Chubb | Mar. 26, 1946 |
| 2,431,745 | Flanagan | Dec. 2, 1947 |

FOREIGN PATENTS

| Number | Country | Date |
| --- | --- | --- |
| 500,298 | Great Britain | Feb. 7, 1939 |